United States Patent
Krishnan et al.

(10) Patent No.: US 7,693,238 B1
(45) Date of Patent: Apr. 6, 2010

(54) METHOD AND SYSTEM FOR V-BLAST DETECTION WITH NEAR MAXIMUM LIKELIHOOD PERFORMANCE AND LOW COMPLEXITY

(75) Inventors: G. Kalyana Krishnan, Kerala (IN); V. Umapathi Reddy, Andhra Pradesh (IN)

(73) Assignee: Hellosoft India PVT. Ltd, Hyderabad (IN)

( * ) Notice: Subject to any disclaimer, the term of this patent is extended or adjusted under 35 U.S.C. 154(b) by 650 days.

(21) Appl. No.: 11/650,666

(22) Filed: Jan. 8, 2007

(51) Int. Cl.
*H04L 27/06* (2006.01)

(52) U.S. Cl. .................. 375/340; 375/347; 375/348

(58) Field of Classification Search ......... 375/259–260, 375/262, 267, 285, 295, 299, 340–341, 346–347, 375/349–350
See application file for complete search history.

(56) References Cited

U.S. PATENT DOCUMENTS

| | | | |
|---|---|---|---|
| 6,314,147 B1* | 11/2001 | Liang et al. ............ | 375/346 |
| 7,123,887 B2* | 10/2006 | Kim et al. ............. | 455/103 |
| 7,221,956 B2* | 5/2007 | Medvedev et al. ....... | 455/522 |
| 7,394,860 B2* | 7/2008 | Tong et al. ............ | 375/267 |
| 7,440,490 B2* | 10/2008 | Kidiyarova-Shevchenko et al. ............... | 375/148 |
| 7,489,746 B1* | 2/2009 | Awater et al. .......... | 375/341 |
| 7,505,788 B1* | 3/2009 | Narasimhan ........... | 455/562.1 |
| 7,583,766 B2* | 9/2009 | Hongming et al. ....... | 375/346 |
| 2003/0026345 A1* | 2/2003 | Muharemovic et al. ... | 375/260 |
| 2006/0203928 A1* | 9/2006 | Cheun et al. ........... | 375/267 |
| 2007/0086549 A1* | 4/2007 | Kim et al. ............. | 375/347 |
| 2007/0105503 A1* | 5/2007 | Kim ..................... | 455/70 |
| 2008/0219374 A1* | 9/2008 | Fernandez-Corbaton et al. ................... | 375/267 |
| 2009/0074097 A1* | 3/2009 | Sadowsky .............. | 375/260 |

OTHER PUBLICATIONS

Yuan Li, Zhi-Quan Luo, Parallel Detection for V-BLAST System, IEEE, 2002, pp. 340-344.

* cited by examiner

*Primary Examiner*—Jean B Corrielus
(74) *Attorney, Agent, or Firm*—William L. Botjer

(57) ABSTRACT

Various embodiments of the present invention relate to a method and system for Vertical Bell Layered Space-Time (V-BLAST) detection with near Maximum Likelihood (ML) performance and low complexity. The V-BLAST system is a Multiple-Input Multiple-Output (MIMO) system. A receiver is provided that detects the data transmitted from the multiple transmitting antennas. The detection performance of such a method and system is better than that of linear receivers while keeping the complexity of the receiver marginally higher than that of the linear receivers. The detection performance of such a method and system is very close to that of the ML receiver while its complexity is much less than that of the ML receiver.

13 Claims, 9 Drawing Sheets

METHOD AND SYSTEM FOR V-BLAST DETECTION WITH NEAR MAXIMUM LIKELIHOOD PERFORMANCE AND LOW COMPLEXITY

BACKGROUND OF THE INVENTION

The present invention relates generally to the field of Multiple-Input-Multiple-Output (MIMO) systems. More specifically, the present invention relates to a receiver for the MIMO system architecture known as Vertical Bell Labs Layered Space-Time (V-BLAST).

MIMO systems are control systems with multiple inputs and outputs and can achieve high spectrum efficiency in a rich multi-path scattering environment. A V-BLAST system is a MIMO space-time architecture that is used in high data-rate wireless communication systems. In the V-BLAST system, a single data stream is de-multiplexed into a number of un-coded parallel data sub-streams at the transmitter. The parallel data sub-streams are referred to as un-coded data layers as there is no inter sub-stream coding present among parallel data sub-streams. The parallel data sub-streams are transmitted from multiple transmitting antennas simultaneously as independent data symbols. The transmitted parallel data sub-streams are received at a single receiver through multiple receiver antennas.

The mechanism of using MIMO systems for data transmission through the V-BLAST systems can be better explained with the help of the following signal models and various mathematical equations.

For an $M_t \times M_r$ MIMO system, $M_r$ and $M_t$ denote the number of receiving and transmitting antennas. The parallel data sub-streams as mentioned above are denoted by $s_i, i=1, \ldots, M_t$ and constitute transmitted data. The number of the parallel data sub-streams is equal to the number of transmitting antennas. The transmitted data is represented by a column vector s which is denoted by $[s_1 \ldots s_{M_t}]^T$. In the case of the V-BLAST system, the parallel data sub-streams $s_i, i=1, \ldots, M_t$ have no inter-sub-stream coding among them and are transmitted as independent data points. $s_i, i=1, \ldots, M_t$ are derived from a signal constellation $A=\{a_1, \ldots, a_\gamma\}$ of size $\gamma$. The received signal for a $M_t \times M_r$ MIMO system under a frequency flat fading scenario, is modeled as $$y = Hs + n$$

where y is the received column vector of length $M_r$; and H is the channel matrix of size $M_r \times M_t$. $H_{ij}$ values of the channel matrix H are channel tap values between $i^{th}$ receiving antenna and $j^{th}$ transmitting antenna. They are assumed to be circularly symmetric Gaussian random variables with zero mean and unit variance. n is a noise vector with components drawn from independent circularly symmetric zero mean complex Gaussian processes with variance $\sigma^2$.

The transmitted parallel data sub-streams, hereinafter referred to as data layers, are obtained at a receiver in the form of the received vector. The receiver detects the transmitted data by decoding the received vector. However, due to interference between the data layers, the receiver may not optimally detect the transmitted data. Various types of receivers can be used for detection of the transmitted data for the V-BLAST system. The optimal receiver is Maximum Likelihood (ML) receiver, which is a non-linear receiver.

The ML receiver determines the vector which is closest to the received vector in the sense of Euclidean distance. The estimate $\hat{s}$ is obtained as $$\hat{s} = \min_{s \in A^{M_t}} (y - Hs) * (y - Hs)$$

where A is the set of constellation points of the data stream, and the superscript * denotes the conjugate transpose. The ML receiver provides full multiplexing gain of order of $M_t$, where $M_t$ is the number of transmitting antennas. Further, the ML receiver also provides a diversity gain of order of $M_r$, where $M_r$ is the number of receiver antennas. The ML receiver provides a very high probability of detection for the transmitted data. Since there are $M_t$ parallel data layers and each data layer can assume $\gamma$ values, the number of searches required to find the transmitted data is $\gamma^{M_t}$. This is known as joint decoding as the data transmitted from $M_t$ antennas is detected simultaneously at the receiver. The complexity of the ML receiver increases exponentially with the number of transmitting antennas as a consequence of the joint decoding. Therefore, the ML receiver is not suitable for practical V-BLAST systems.

Conventionally, linear receivers have been used for V-BLAST. One such linear receiver is a Zero-Forcing with Successive Interference Cancellation (ZF-SIC) Receiver. Here, diagonal entry of $(H^*H)^{-1}$ with minimum value is determined. Let this be $i^{th}$ entry. Then, the $i^{th}$ row of $(H^*H)^{-1}H^*$ is denoted by a weight vector $w_i$. The diagonal entry with minimum value corresponds to the data point with maximum post-detection Signal to Noise Ratio (SNR). Then an estimate $d_i$ can be calculated for the data layer corresponding to $i^{th}$ row vector as, $$d_i = w_i y$$

Further, $d_i$ is decoded to the closest constellation point $a_l$ from A,$l=1, \ldots \gamma$, $d_i$ being closest to $a_l$ in terms of Euclidean distance. Received vector y is then updated by subtracting out the contribution of $a_l$ from the received vector. For example, an updated y is obtained as $$y = y - H_i a_l, \text{ where } H_i \text{ denotes the } i^{th} \text{ column of H.}$$

Further, H is updated by deleting the column corresponding to the decoded data layer, i.e., column $H_i$.

The above process is continued until the data layers corresponding to all columns of H are decoded. The number of computations required to detect the transmitted data is of the order of $M^3$ where $M_t = M_r = M$. As a result, the complexity of the ZF-SIC receiver is low, as compared to that of the ML receiver. However, the detection performance of the ZF-SIC receiver is much below that of the ML receiver.

Another type of linear receiver is a Minimum Mean-Square-Error with Successive Interference Cancellation (MMSE-SIC) receiver. The MMSE-SIC receiver is similar to ZF-SIC receiver. In MMSE-SIC receiver, the diagonal entry for $(H^*H + \sigma^2 M_t I)^{-1}$ with minimum value is determined, where I denotes an identity matrix. Let this be $i^{th}$ entry. The $i^{th}$ row of $(H^*H + \sigma^2 M_t I)^{-1} H^*$ corresponds to weight vector $w_i$. The remaining steps in data decoding are same as that of ZF-SIC receiver. The complexity of the MMSE-SIC receiver is of the same order as that of the ZF-SIC and is hence low when compared to that of ML receiver. However, the detection performance of the MMSE-SIC receiver is much below that of the ML receiver.

In view of the foregoing discussion, there is a need for a receiver that bridges the gap between the detection performance of the ML receiver and that of the ZF-SIC and MMSE-SIC receivers. The receiver's detection performance should be better than that of the ZF-SIC/MMSE-SIC receiver. The complexity of the receiver should be almost the same as that exhibited in the ZF-SIC/MMSE-SIC receiver. The receiver should have detection performance close to ML performance, while concurrently keeping the complexity less than that of the ML receiver.

SUMMARY OF THE INVENTION

An object of the present invention is to provide a method and a system for Vertical Bell Labs Layered Space Time (V-BLAST) detection with detection performance very close to that of Maximum Likelihood (ML) receiver.

Another objective of the present invention is to provide a method and a system for V-BLAST detection with complexity much below that of the ML receiver and close to that of linear receivers.

Various embodiments of the present invention provide a method and system for V-BLAST detection with near Maximum Likelihood (ML) performance and low complexity. The V-BLAST system is a Multiple-Input Multiple-Output (MIMO) system that transmits data through multiple transmitting and receiving antennas. The data is transmitted from the multiple transmitting antennas simultaneously as multiple data layers. The data layers are received at a receiver in the form of a received vector. The received vector is decoded to detect the transmitted data. The method of detecting the transmitted data involves calculating a matrix on the basis of a channel matrix of the V-BLAST system. Further, the maximum diagonal entry in the matrix is found. Furthermore, the channel matrix is updated by deleting a column corresponding to the maximum diagonal entry. The column corresponding to the maximum diagonal entry corresponds to the minimum post-detection Signal to Noise Ratio (SNR). Updated received vectors are calculated on the basis of a data layer corresponding to maximum diagonal entry. The data layer corresponding to the maximum diagonal entry corresponds to minimum post-detection SNR. The updated received vectors are calculated for all possible constellation points from the signal constellation of the data layer, where $\gamma$ is the size of the signal constellation. After obtaining a set of updated received vectors, Successive Interference Cancellation (SIC) iterations are performed for each updated received vector for decoding the remaining data layers. The SIC iterations are performed using the updated channel matrix until each data layer is decoded. As a result, a set of reduced possible solution vectors are obtained from the SIC iterations. Further, a Maximum Likelihood (ML) search is performed on the set of reduced possible solution vectors to obtain a solution vector that is closest to the received vector. The solution vector closest to the received vector corresponds to the transmitted data.

BRIEF DESCRIPTION OF THE DRAWINGS

Various embodiments of the present invention will hereinafter be described in conjunction with the appended drawings provided to illustrate, and not to limit the present invention, wherein like designations denote like elements, and in which.

DESCRIPTION OF VARIOUS EMBODIMENTS

Various embodiments of the present invention provide a method and system for V-BLAST detection with near Maximum Likelihood performance and low complexity. The V-BLAST system is a Multiple-Input Multiple-Output (MIMO) system. In the V-BLAST system, the data transmitted from multiple transmitting antennas is received at a receiver through multiple receiving antennas. The data received at the receiver is decoded using various detection techniques to obtain the transmitted data. A non-linear detection technique such as Maximum Likelihood (ML) detection technique can be used for an optimal detection of the transmitted data. However, the ML detection technique is not practical due to high computational complexity. Further, linear receivers such as Zero-Forcing with Successive Interference Cancellation (ZF-SIC) receiver and Minimum Mean-Squared-Error with Successive Interference Cancellation (MMSE-SIC) receiver use low complexity detection techniques. However, the detection performance of the linear receivers is low.

Various embodiments of the present invention provide a receiver with a detection performance that is better than the detection performance of linear receivers while keeping the complexity of the receiver marginally higher than the complexity of the linear receivers. The detection performance of the provided receiver is very close to that of the ML receiver along with much lesser complexity than that of the ML receiver.

Figure 1:
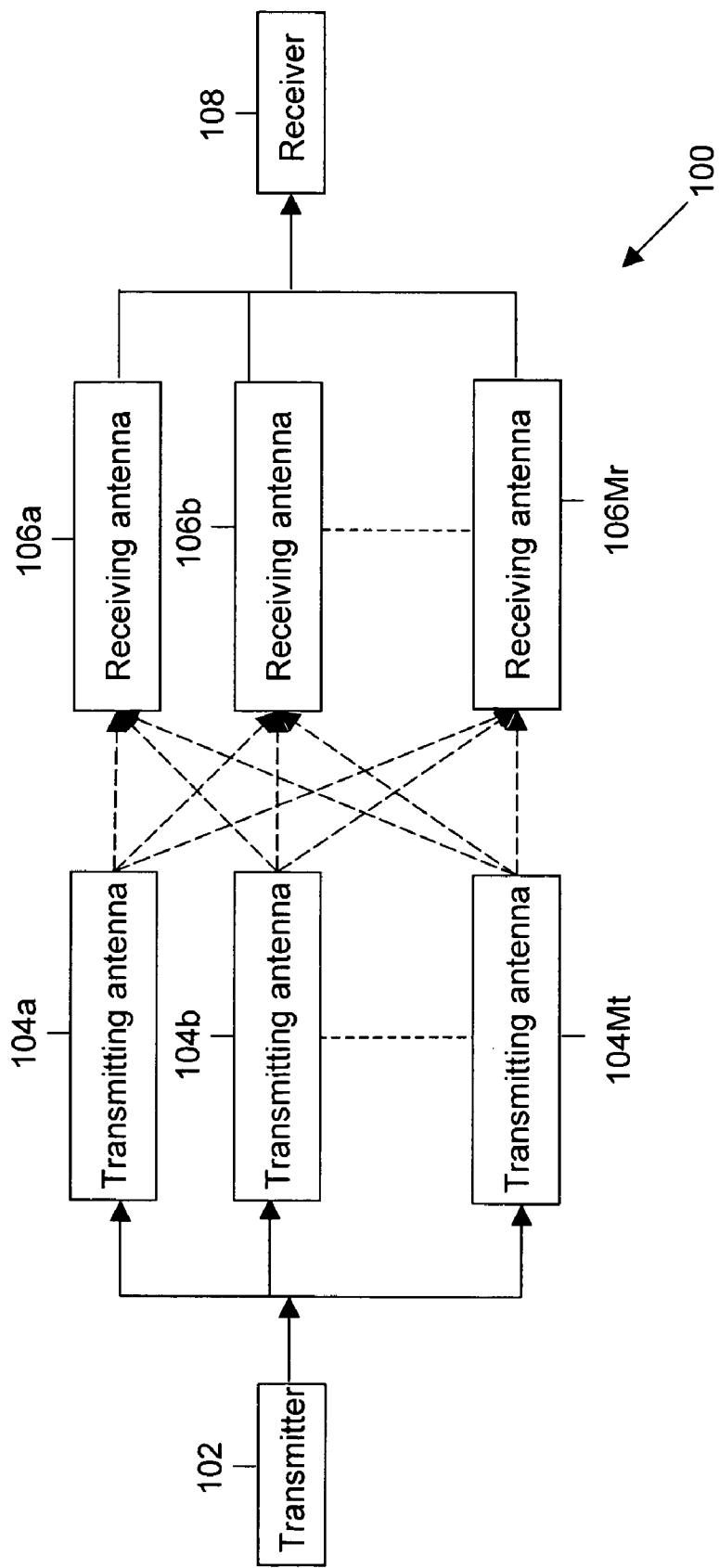
FIG. 1 illustrates an exemplary environment, wherein various embodiments of the present invention can be practiced.

FIG. 1 illustrates an exemplary environment, wherein various embodiments of the present invention can be practiced. The environment illustrates a Multiple-Input Multiple-Output (MIMO) system such as a Vertical Bell Labs Layered Space-Time (V-BLAST) system 100. V-BLAST system 100 includes a transmitter 102 for transmitting a data stream. V-BLAST system 100 further includes multiple transmitting antennas 104a, 104b . . . 104$M_t$, hereinafter collectively referred to as transmitting antennas 104. The number of transmitting antennas 104 is equal to $M_t$. However, for the purpose of illustration, only three transmitting antennas from transmitting antennas 104 are shown in the figure. The data stream that is to be transmitted from transmitter 102 is drawn from a signal constellation $A=\{a_1, \ldots, a_\gamma\}$ of size $\gamma$. Therefore, the data stream can assume values that belong to the signal constellation A.

For the purpose of transmitting the data stream through transmitting antennas 104, the data stream is de-multiplexed into $M_t$ parallel data sub-streams, hereinafter referred to as data layers. The data layers are transmitted from each of transmitting antennas 104 as un-coded and independent transmitted data points.

The combined data transmitted from transmitting antennas 104 is represented by a column vector s, hereinafter referred to as transmitted data. s is denoted by $[s_1 \ldots s_{M_t}]^T$, wherein $s_i, i=1, \ldots, M_t$ are the transmitted data points. As discussed above, the transmitted data points have no inter-sub-stream coding present among them and are transmitted as independent data points. $s_i, i=1, \ldots, M_t$ are drawn from the signal constellation $A=\{a_1, \ldots, a_\gamma\}$ of size $\gamma$. As a result, each transmitted data point can assume values that belong to the signal constellation A. Since the data transmitted from each of transmitting antennas 104 is independent and equally likely, and also that they are drawn from the same signal constellation A, the average total transmitted power of the transmitted data is ensured to be unity by fixing the average power of the signal constellation A to $1/M_t$.

The transmitted data points are received at multiple receiving antennas 106a, 106b . . . 106M_r, hereinafter collectively referred to as receiving antennas 106. The total number of receiving antennas 106 is equal to $M_r$. However, for the purpose of illustration, only three receiving antennas from receiving antennas 106 are shown in FIG. 1. Each receiving antenna from receiving antennas 106 receives information from each transmitting antenna 104. The combined information about all the data layers is received at a receiver 108 through receiving antennas 106 in the form of a received vector Receiver 108 can decode the received vector to obtain the transmitted data. However, the received vector will be a superposition of the different data layers and every data layer sees interference from all other data layers.

Various embodiments of the present invention provide receiver 108 that decodes the transmitted data points with high detection performance and low complexity, in spite of the interference between the data layers.

For V-BLAST system 100, the vector received by receiver 108 under a frequency flat fading scenario can be modeled as $$y=Hs+n$$

where y is the received vector and H is the channel matrix of V-BLAST system 100 of MIMO order $M_r \times M_t$. $M_t$ is equal to the number of transmitting antennas 104. Similarly $M_r$ is equal to the number of receiving antennas 106. $H_{ij}$ are channel tap values between $i^{th}$ receiving antenna and $j^{th}$ transmitting antenna. The channel tap values are assumed to be circularly symmetric Gaussian random variables with zero mean and unit variance. n is a noise vector with components drawn from independent circularly symmetric zero mean complex Gaussian processes with variance $\sigma^2$. Received vector y is a superposition of all the transmitted data layers weighted by the channel gains, plus the additive white gaussian noise.

Figure 2:
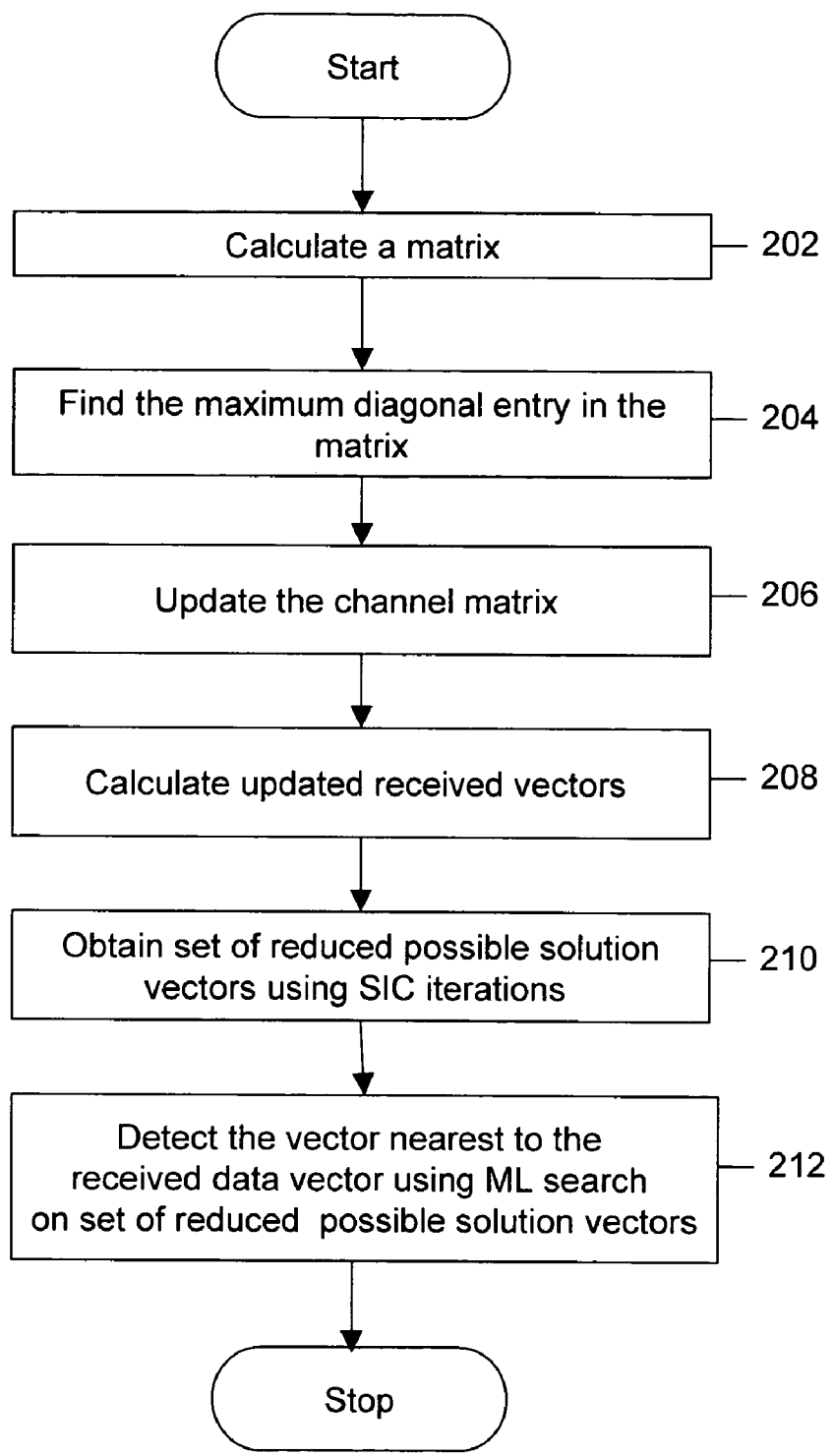
FIG. 2 is a flowchart illustrating a method for detecting the transmitted data at a receiver, in accordance with various embodiments of the present invention.

FIG. 2 is a flowchart illustrating a method for detecting the transmitted data at receiver 108, in accordance with various embodiments of the present invention. At step 202, a matrix is calculated on the basis of channel matrix of the V-BLAST system. In accordance with an embodiment of the present invention, the matrix is given by mathematical term $(H^*H)^{-1}$. H is the channel matrix of V-BLAST system 100 and superscript * denotes complex conjugate transpose of the channel matrix.

In accordance with another embodiment of the present invention, the matrix is given by the mathematical term $(H^*H+\sigma^2 M_t I)^{-1}$. $\sigma^2$ is the variance of noise corrupting received signal at each of receiving antennas 106 and I is an identity matrix.

At step 204, the maximum diagonal entry of the matrix is found. Let this be $i^{th}$ entry. The $i^{th}$ entry corresponds to minimum post-detection Signal to Noise Ratio (SNR). At step 206, the channel matrix H is updated by deleting the $i^{th}$ column of the channel matrix. The $i^{th}$ column of the channel matrix H corresponds to $i^{th}$ data layer.

At step 208, updated received vectors are calculated. The received vector is updated for all possible constellation points of the $i^{th}$ data layer. The updating of the received vector for the $i^{th}$ data layer corresponds to the removal of all possible interference of the $i^{th}$ data layer from the received vector. The $i^{th}$ data layer corresponds to minimum post-detection SNR and is therefore referred to as the weakest data layer.

The $i^{th}$ data layer is mapped to all possible constellation points from the signal constellation A. Since the correct transmitted data point for the $i^{th}$ data layer is not known, the interference of the $i^{th}$ data layer is cancelled from the received vector by canceling the contribution of each possible constellation point from the signal constellation A. The updated received vectors are calculated for each possible constellation point of the signal constellation A. Therefore, the total number of the updated received vectors is equal to the size of the signal constellation A. For example, if y is the received vector, and $\{a_1, \ldots, a_\gamma\}$ are the constellation points of the signal constellation A of size $\gamma$, then the updated received vectors are calculated as $$y^l = y - H_i a_l, l=1, \ldots, \gamma$$

where $H_i$ is the column of the channel matrix corresponding to the $i^{th}$ data layer, $H_i a_l$ is the contribution of $a_l$ to the received vector. $y^1, \ldots, y^\gamma$ are the updated received vectors for each possible constellation point of the signal constellation A for the $i^{th}$ data layer. The updated received vectors can then be decoded for each of the remaining data layers.

At step 210, Successive Interference Cancellation (SIC) iterations are performed for each updated received vector for each of the remaining data layers using updated H. For each updated received vector, a set of transmitted data points are obtained for each data layer. Consequently, a set of reduced possible solution vectors of size $\gamma$ is obtained. The set of reduced possible solution vectors $b_l, l=1, \ldots \gamma$ can be represented by $\{S\}$, where $\{S\}=\{b_1, \ldots b_\gamma\}$. Each of $\{b_1, \ldots b_\gamma\}$ is a candidate transmit data vector (i.e., a possible solution vector). The total number of reduced possible solution vectors obtained is equal to $\gamma$. Further, at step 212, a Maximum Likelihood (ML) search is performed on the set of reduced possible solution vectors. The objective of the ML search is to find a solution vector nearest to the received vector in the set of reduced possible solution vectors of size $\gamma$. The solution vector that is nearest to the received vector is decoded as transmitted data points. From the set of possible solution vectors, the vector nearest to the received vector is obtained as, $$\hat{s} = \min_{b \in S}(y-Hb)*(y-Hb)$$

$\hat{s}$ is the estimate of the transmitted column vector, b represents reduced possible solution vectors from S. The number of searches required to find the ML estimate is equal to size of S. The value of $\hat{s}$ is decoded as the transmitted data vector. The transmitted data vector is one from the set of reduced possible solution vectors. The transmitted data vector has all data layers decoded correctly, and no other solution vector from the set of reduced possible solution vectors can have all data layers decoded correctly. The solution vectors other than the transmitted data vector will have the first data layer wrongly decoded.

Figure 3:
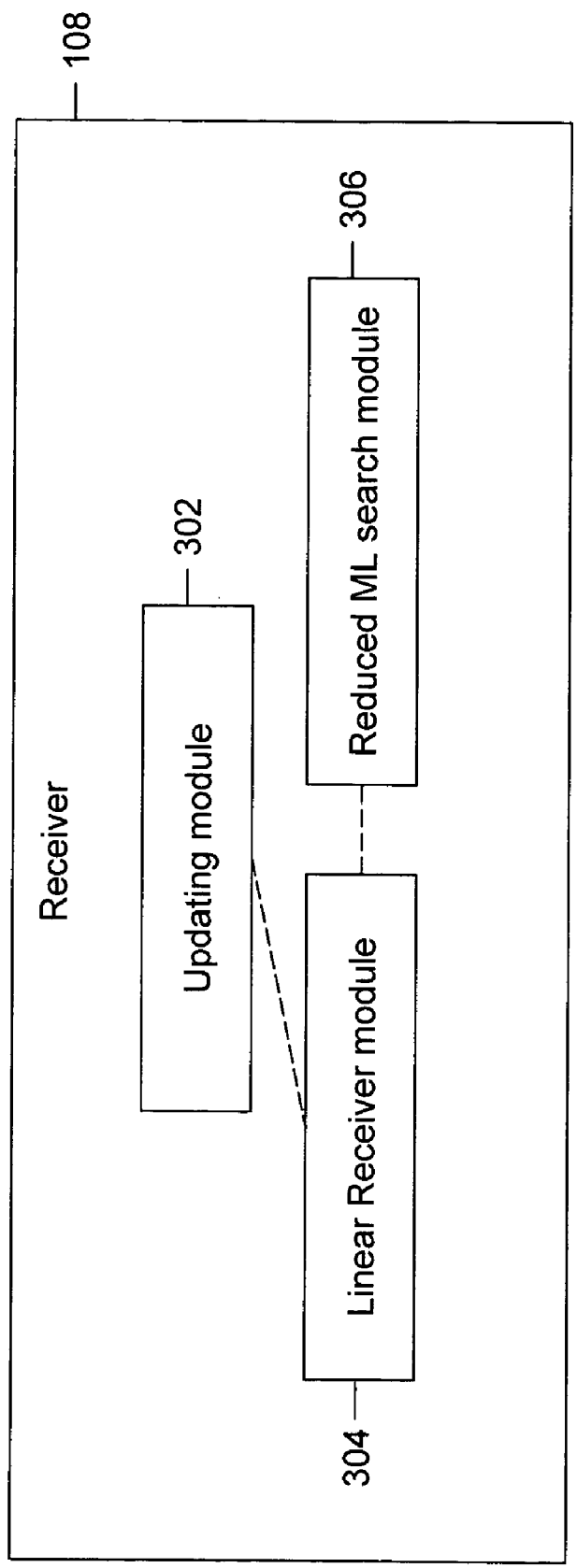
FIG. 3 illustrates a receiver for detecting the transmitted data, in accordance with various embodiments of the present invention.

FIG. 3 illustrates receiver 108 for detecting the transmitted data, in accordance with various embodiments of the present invention. Receiver 108 includes an updating module 302, a linear receiver module 304, and a reduced ML search module 306. Updating module 302 calculates updated received vectors by canceling out the interference from the $i_{th}$ data layer. As explained in the flowchart, the $i_{th}$ data layer is selected on the basis of the minimum post-detection SNR.

The $i_{th}$ data layer can be mapped to all the possible constellation points of the signal constellation A. However, the correct transmitted data point for the $i_{th}$ data layer is not known, therefore, the interference of the $i_{th}$ data layer is cancelled out from the received vector by cancelling out the contribution of each possible constellation point of the signal constellation. The received vector is updated for each possible constellation point. As a result, the total number of updated received vectors is equal to the possible constellation points of the signal constellation A.

Further, linear receiver module 304 decodes each updated received vector for each of the remaining data layers. Examples of linear receiver module 304 may include, but are not limited to, a Zero-Forcing with Successive Interference Cancellation (ZF-SIC) linear receiver module and a Minimum Mean-Square-Error with Successive Interference Cancellation (MMSE-SIC) linear receiver module.

In accordance with an embodiment of the present invention, whenever the mapped constellation point is the same as that of the transmitted data point, linear receiver module 304 sees an effective system with only $M_t-1$ transmitted data points. As a result, linear receiver module 304 achieves added diversity for each of the remaining data layers. In addition, by choosing to remove the weakest layer corresponding to minimum post-detection SNR, linear receiver module 304 has a better chance of decoding the remaining $M_t-1$ data layers whenever the mapped constellation point is the same as that of the transmitted data point.

For the special case of $M_t=2$, when the SIC iterations are performed on the basis of zero forcing criterion, removal of the data layer corresponding to minimum post-detection SNR provides additional diversity to the remaining data layer whenever the mapped constellation point is same as the transmitted data point. For $M_t=2$, after mapping a constellation point to the data layer corresponding to the minimum post-detection SNR, there is only one remaining data layer to be decoded. When the mapped constellation point is same as that of the transmitted data point, the probability of deep fade event at the detection of remaining data layer is given by, $$P(\text{deep fade event}) = P(\max(|H_1|^2, |H_2|^2) \leq x), \text{ where x is of the order of}$$

$$\frac{1}{SNR}.$$

Noting that $|H_1|^2, |H_2|^2$ are independent chi-square random variables with $2M_r$ degrees of freedom, the distribution of $\max(|H_1|^2, |H_2|^2)$ is $F^2(x)$ where $F(x)$ is given by $$F(x) = 1 - e^{-x} \sum_{k=0}^{M_r-1} \frac{x^k}{k!} = e^{-x} \sum_{k=M_r}^{\infty} \frac{x^k}{k!}$$

For high SNR, F can be approximated by $x^{M_r}/(M_r!)$. Hence $$P\left(\max(|H_1|^2, |H_2|^2) \leq \frac{1}{SNR}\right) \approx \frac{1}{SNR^{2M_r}(M_r!)^2}.$$

From this it can be concluded that the diversity seen by the remaining data layer whenever the mapped constellation point is same as the transmitted data point is given by $2M_r$. The additional diversity enhances the probability that the transmitted data vector falls in the set of reduced possible solution vectors.

Further, linear receiver module 304 sees the effective system with $M_t-1$ transmitting antennas 104 after the $i^{th}$ data layer is removed. In accordance with an embodiment of the present invention, linear receiver module 304 requires the condition $M_r \geq M_t-1$ to be fulfilled for decoding the data layers of V-BLAST system 100 of MIMO order $M_r \times M_t$.

In accordance with an embodiment of the present invention, the matrix is given by mathematical term $(H^*H)^{-1}$ when linear receiver module 304 is a ZF-SIC linear receiver module.

In accordance with another embodiment of the present invention, the matrix is given by mathematical term $(H^*H + \sigma^2 M_t I)^{-1}$ when linear receiver module 304 is an MMSE-SIC linear receiver module.

Consequently, linear receiver module 304 outputs a set of reduced possible solution vectors of size $\gamma$ obtained from the SIC iterations. The set of reduced possible solution vectors $b_l$, $l=1, \ldots \gamma$ can be represented by $\{S\}$, where $\{S\} = \{b_1, \ldots b_\gamma\}$. Each of $\{b_1, \ldots b_\gamma\}$ is a possible transmitted data vector.

Reduced ML search module 306 determines the solution vector nearest to the received vector from the set of reduced possible solution vectors by performing a Maximum Likelihood (ML) search on each of the reduced possible solution vectors. The solution vector nearest to the received vector is detected as the transmitted data vector. The transmitted data vector provides the set of the transmitted data points.

In accordance with an embodiment of the present invention, when linear receiver module 304 is the ZF-SIC linear receiver module, the algorithm used by receiver 108 to detect the transmitted data is known as ZF-SIC-SEARCH.

In accordance with another embodiment of the present invention, when linear receiver module 304 is the MMSE-SIC linear receiver module, the algorithm used by receiver 108 to detect the transmitted data is known as MMSE-SIC-SEARCH.

The detection performances of different algorithms on the basis of MIMO order and signal constellation size have been compared with reference to FIGS. 4, 5, and 6.

The elements of H and n for V-BLAST system 100 are modeled as independent and identically distributed zero mean complex Gaussian random variables, with unit variance for the elements of H while the variance of the elements of n is fixed to give the desired SNR. The SNR is computed as reciprocal of the variance of an element of n since the averaged received signal power at any antenna is unity in view of the signal model.

Figure 4A:
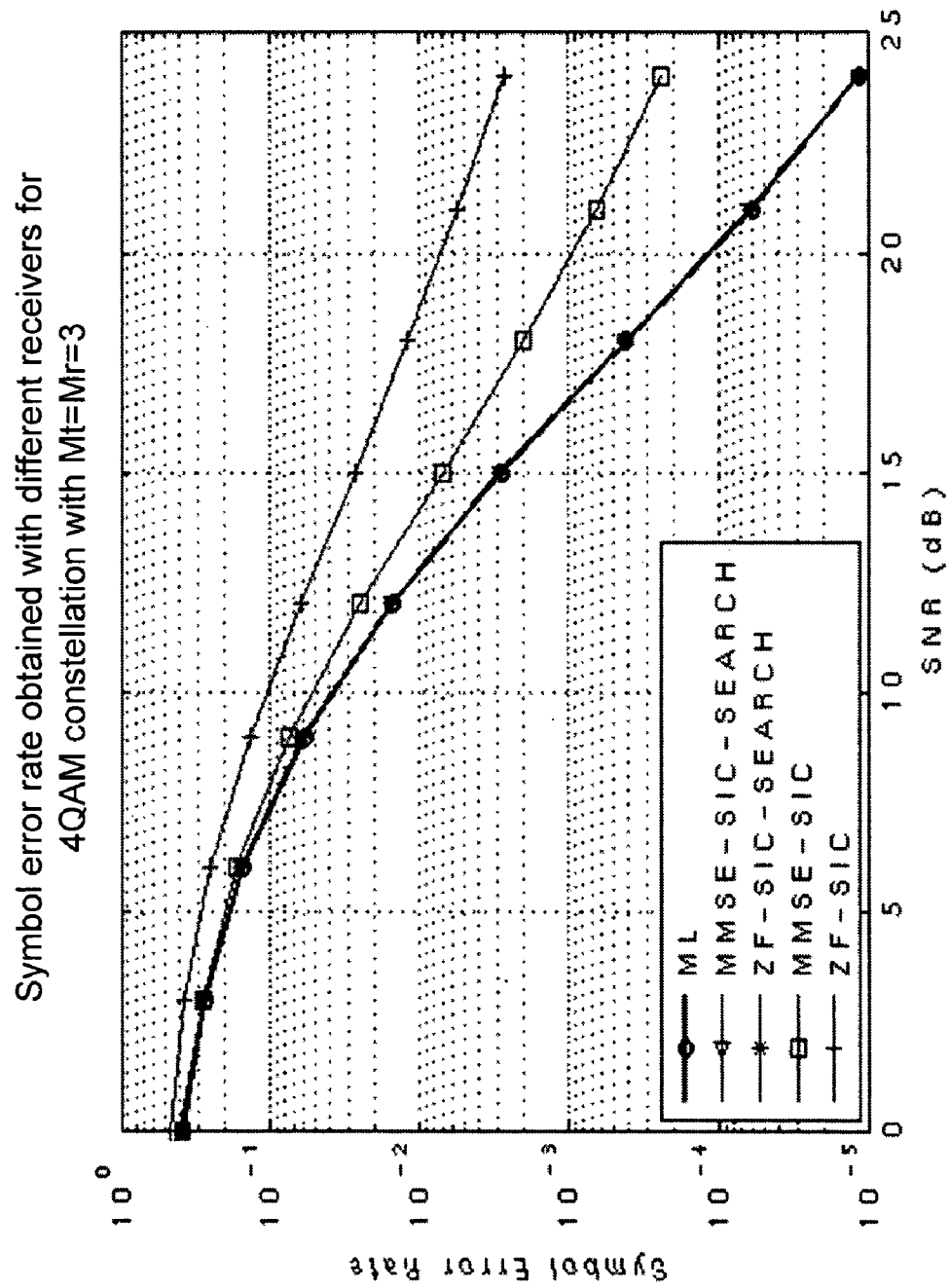
FIGS. 4a and 4b illustrate a comparison of detection performances of a receiver with ML and linear receivers, for 3×3 V-BLAST systems in accordance with various embodiments of the present invention.
Figure 4B:
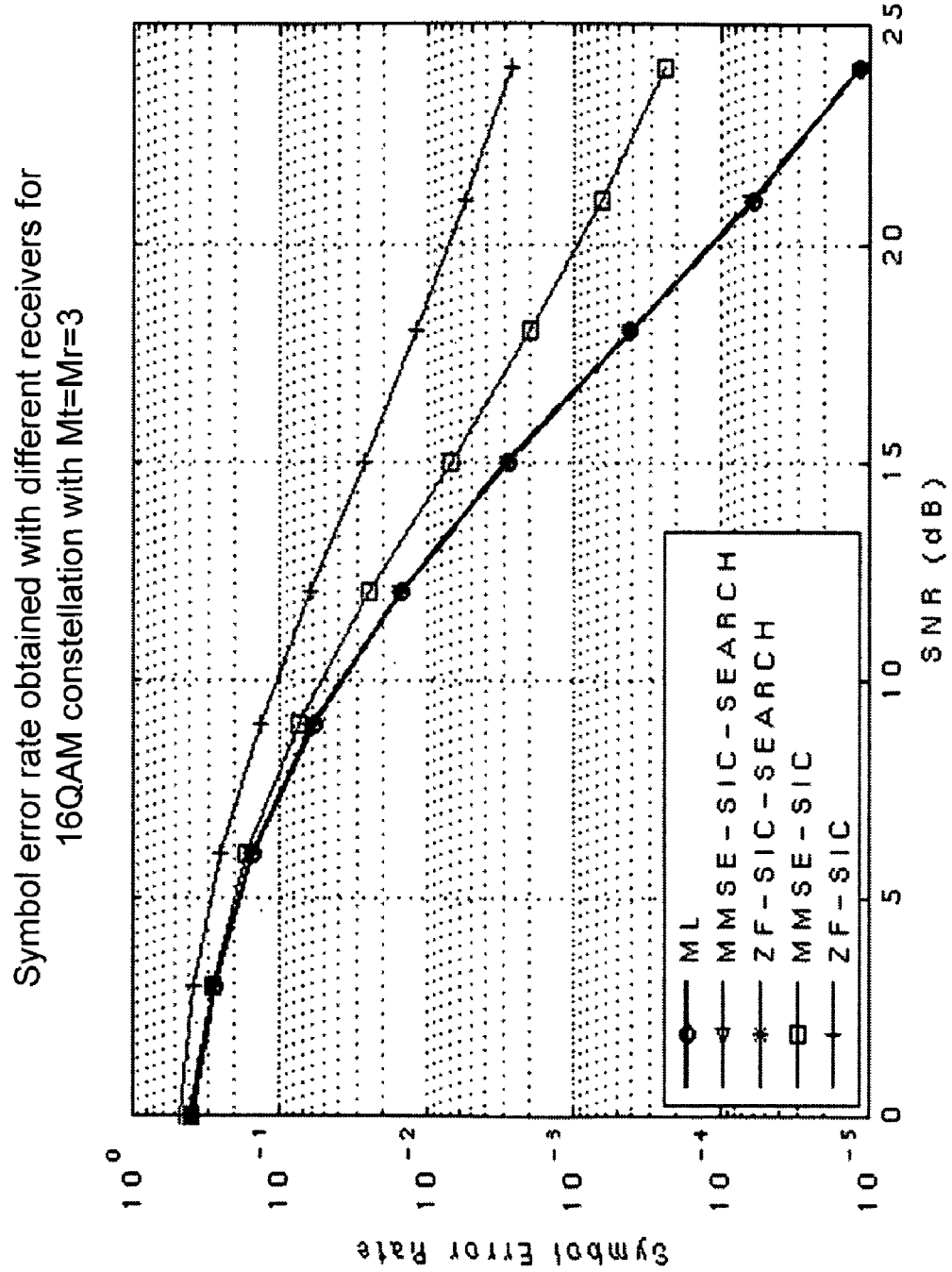

FIGS. 4a and 4b illustrate a comparison of detection performances of receiver 108 with ML and linear receivers for 3×3 V-BLAST system 100, in accordance with various embodiments of the present invention. Receiver 108 uses algorithms MMSE-SIC-SEARCH and ZF-SIC-SEARCH for detection, whereas the linear receivers use algorithms such as MMSE-SIC and ZF-SIC for detection. FIG. 4a represents the symbol error rate for different receivers with a data stream drawn from a 4-QAM signal constellation. Similarly, FIG. 4b represents the symbol error rate for different receivers with data streams drawn from a 16-QAM signal constellation. The symbol error rate graphs for receiver 108 using algorithms such as MMSE-SIC-SEARCH and ZF-SIC-SEARCH overlap with that of the ML receiver.

Figure 5A:
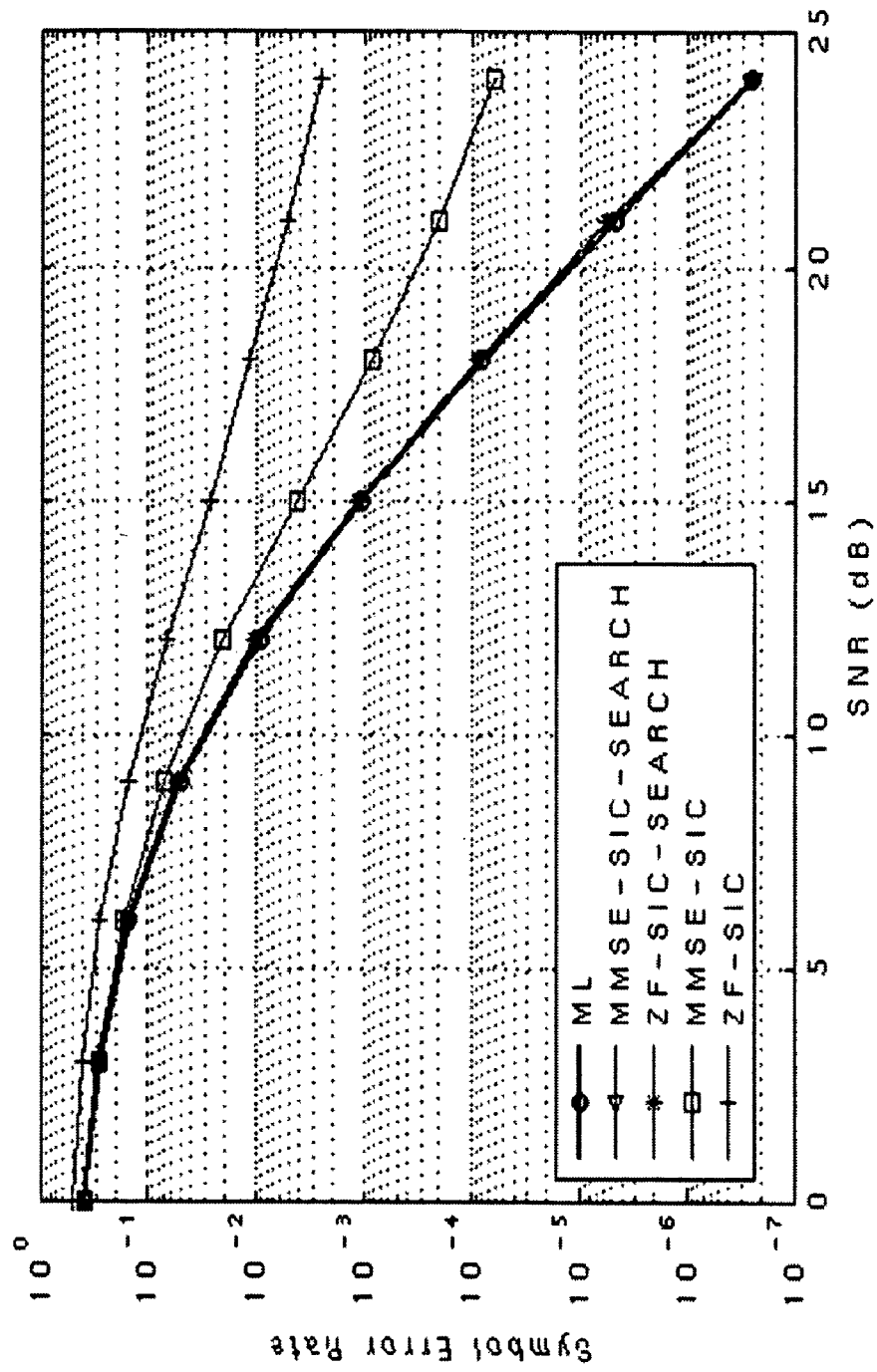
FIGS. 5a and 5b illustrate a comparison of detection performances of a receiver with ML and linear receivers, for 4×4 V-BLAST systems in accordance with various embodiments of the present invention.
Figure 5B:
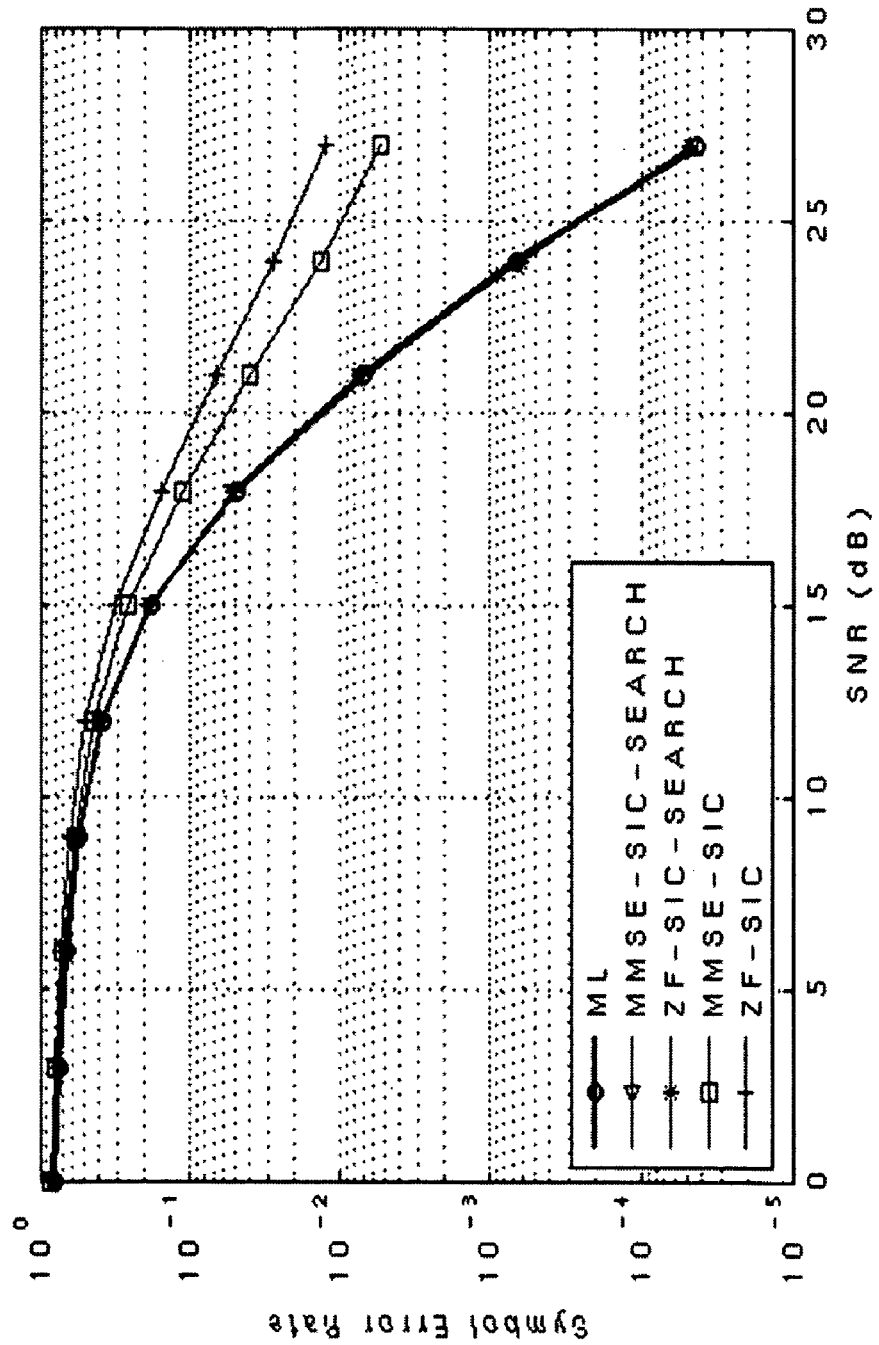

FIGS. 5a and 5b illustrate a comparison of detection performances of receiver 108 with ML and linear receivers for 4×4 V-BLAST system 100, in accordance with various embodiments of the present invention. Receiver 108 uses algorithms MMSE-SIC-SEARCH and ZF-SIC-SEARCH for detection, whereas the linear receivers use algorithms such as MMSE-SIC and ZF-SIC for detection. FIG. 5a represents the symbol error rate for different receivers with a data stream drawn from a 4-QAM signal constellation. Similarly, FIG. 5b represents symbol error rate for different receivers with a data stream drawn from a 16-QAM signal constellation. The symbol error rate graphs for receiver 108 using algorithms such as MMSE-SIC-SEARCH and ZF-SIC-SEARCH overlap with that of the ML receiver.

Figure 6A:
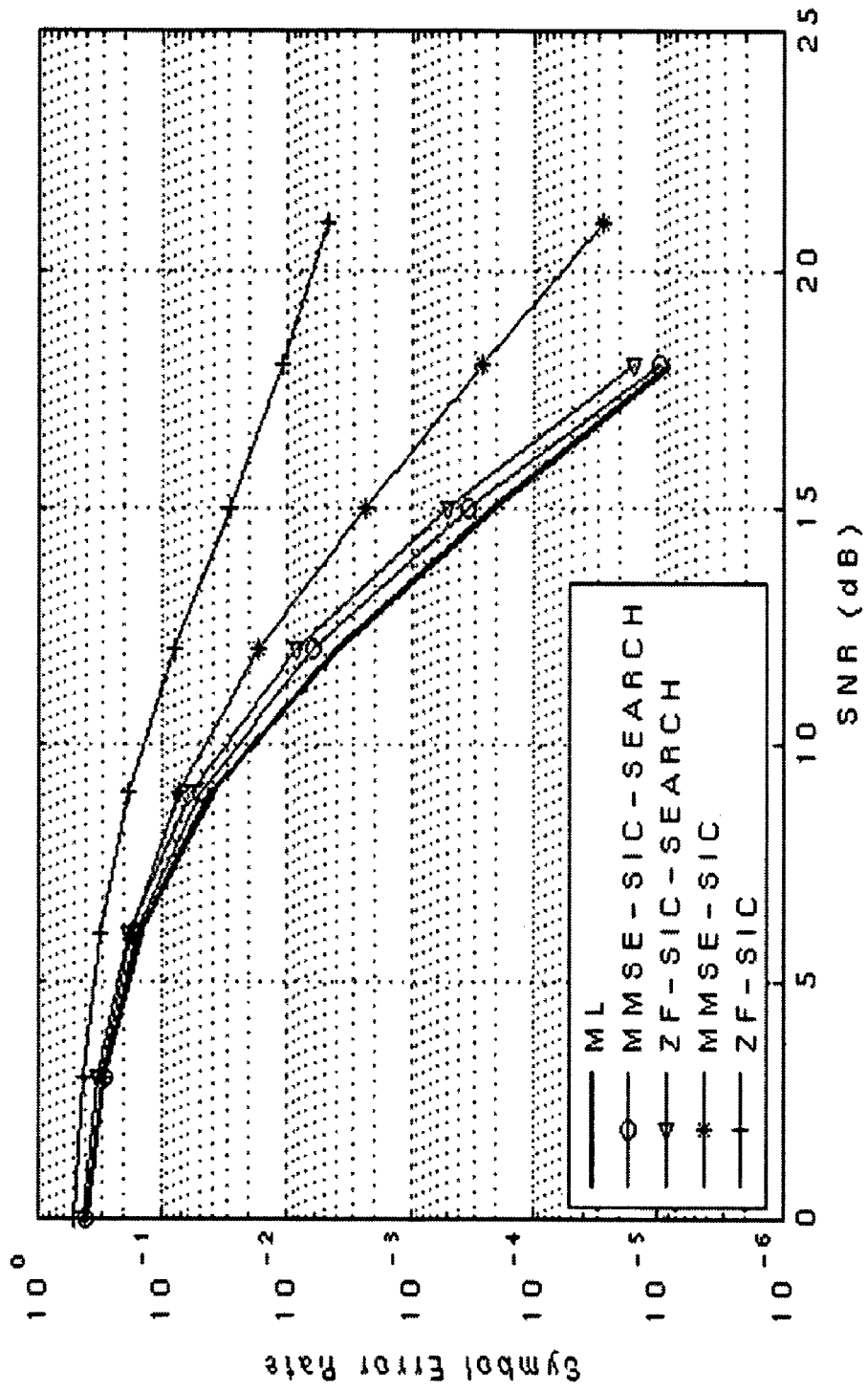
FIGS. 6a and 6b illustrate a comparison of detection performance of a receiver with ML and linear receivers, for 6×6 and 8×8 V-BLAST systems in accordance with various embodiments of the present invention.
Figure 6B:
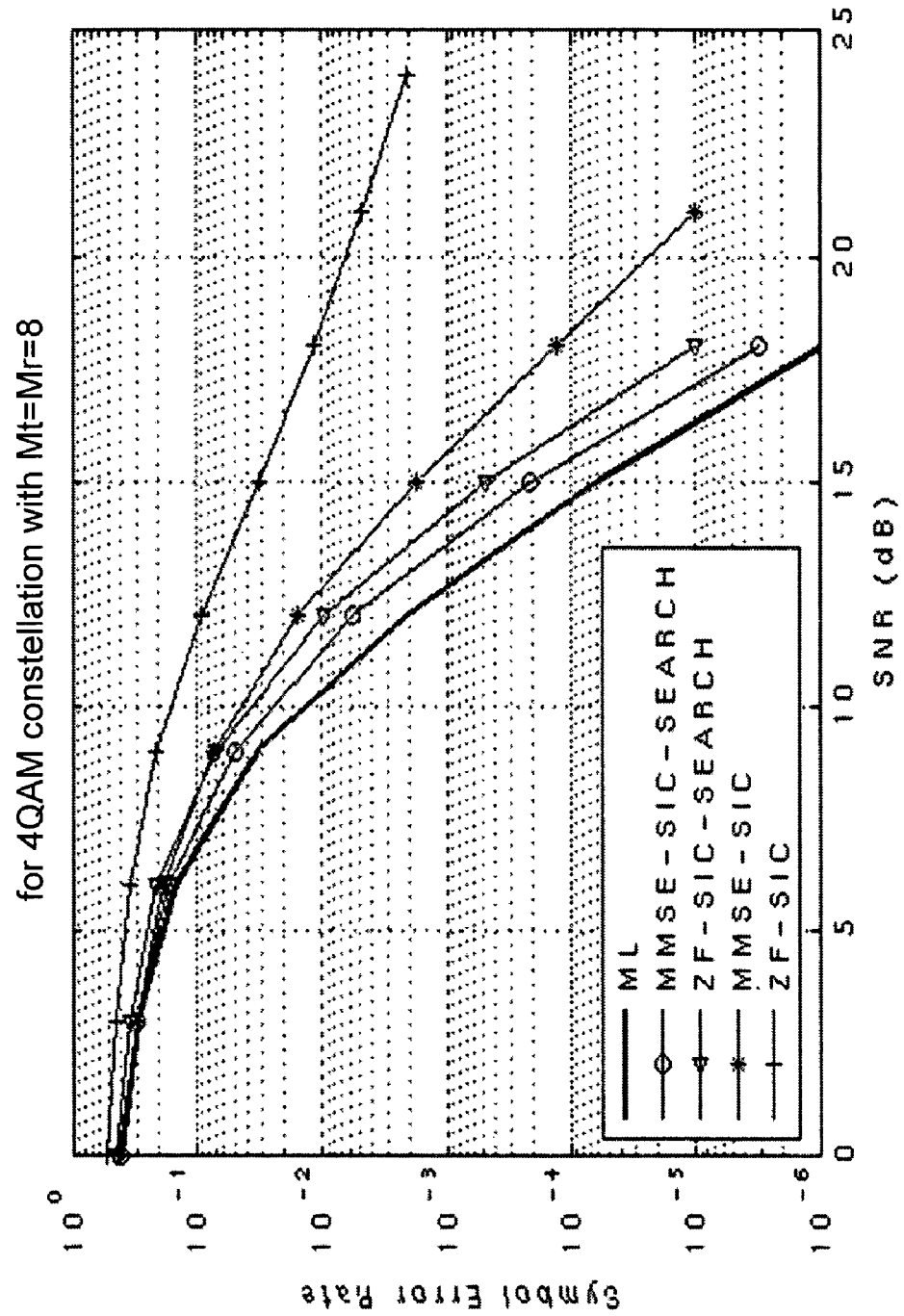

FIGS. 6a and 6b illustrate a comparison of detection performances of receiver 108 with ML and linear receivers for 6×6 and 8×8 V-BLAST system 100 respectively, in accordance with various embodiments of the present invention. Receiver 108 uses algorithms MMSE-SIC-SEARCH and ZF-SIC-SEARCH for detection, whereas the linear receivers use algorithms such as MMSE-SIC and ZF-SIC for detection. FIG. 6a represents the symbol error rate for different receivers with data stream drawn from a 4-QAM signal constellation in 6×6 V-BLAST system 100. Further, FIG. 6b represents the symbol error rate for different receivers with a data stream drawn from a 4-QAM signal constellation in 8×8 V-BLAST system 100.

From the above-described results, it is observed that the detection performance of receiver 108 using algorithms MMSE-SIC-SEARCH and the ZF-SIC-SEARCH is much better than that of linear receivers using algorithms such as MMSE-SIC and ZF-SIC. Moreover, when MIMO order is small, MMSE-SIC-SEARCH and ZF-SIC-SEARCH perform nearly the same as ML. As a result, detection performance of receiver 108 is close to that of a ML receiver when the number of transmitting antennas 104 and receiving antennas 106 is small. When $M_t=M_r=M=2$, receiver 108 is equivalent to an ML receiver when the linear receiver module in 304 is ZF-SIC. However, as the MIMO order increases, the detection performance of receiver 108 falls below that of the ML receiver, and the gap between the performance of ML receiver and receiver 108 increases with an increase in the number of transmitting antennas 104 and receiving antennas 106.

After comparing the detection performances of receiver 108 with linear receivers and the ML receiver, the complexity of receiver 108 is compared with linear receivers and the ML receiver. The complexity of MMSE-SIC-SEARCH and ZF-SIC-SEARCH is compared with the complexity of ZF-SIC, MMSE-SIC and ML.

The total number of multiplications required for performing the ZF-SIC is of $O(M^3)$ (i.e. order of $M^3$), where M is equal to the number of transmitting antennas 104 and receiving antennas 106. The overall multiplications required for the ZF-SIC are approximately $5/2$ $M^3$. The ordering of the data layers that are to be decoded at each stage of SIC is done on the basis of post-detection SNR using QR decomposition. $(H^*H)^{-1}H^*$ matrix needs to be calculated explicitly only for the first stage of SIC, but for the remaining stages, it can be derived recursively. Once the data layer ordering is done, the data decoding is done using QR decomposition followed by back substitution. For the ZF-SIC-SEARCH, the overall computations required are $5/2M^3+3/2\gamma M^2$. The additional factor $3/2\gamma M^2$ is due to the repeated back substitutions for forming the set of possible solution vectors and for searching the solution vector nearest to the received vector in the set of the reduced possible solution vectors of size $\gamma$.

The total number of multiplications required for performing the MMSE-SIC is of $O(M^3)$ (i.e., order of $M^3$), where M is equal to the number of transmitting antennas 104 and receiving antennas 106. The overall multiplications required for the MMSE-SIC are approximately $7M^3$, where $M_t=M_r=M$. For the MMSE-SIC-SEARCH, the overall computations required are $7M^33+3\gamma M^2$. The additional factor $3\gamma M^2$ is required for multiplication with nulling vectors and updation of the received vector, for each mapping of a data layer in the first step, and for searching the solution vector nearest to the received vector in the set of reduced possible solution vectors of size $\gamma$.

The complexity of the ML decoder is of the order of $\gamma^{M_t}$. The complexity of the ML search increases exponentially with the increase in the number of transmitting antennas 104 as a result of the joint decoding.

The following tables give a fair comparison of complexity of different receivers. Table 1 compares the complexity of the MMSE-SIC-SEARCH with the complexity of the MMSE-SIC and the ML

TABLE 1

Complexity of ML, MMSE-SIC and MMSE-SIC-SEARCH

| | 4-QAM | | | 16-QAM | | |
| --- | --- | --- | --- | --- | --- | --- |
| $M_t = M_r = M$ | ML $\gamma^M M^2$ | MMSEC-SIC $7 M^3$ | MMSEC-SIC-SEARCH $7 M^3 + 3 \gamma M^2$ | ML $\gamma^M M^2$ | MMSE-SIC $7 M^3$ | MMSE-SIC-SEARCH $7 M^3 + 3 \gamma M^2$ |
| 2 | 64 | 56 | 104 | 1024 | 56 | 248 |
| 3 | 576 | 189 | 297 | 36864 | 189 | 621 |
| 4 | 4096 | 448 | 640 | 1048576 | 448 | 1216 |

Table 1 gives the complexity of ML, MMSE-SIC and MMSE-SIC-SEARCH for 4-QAM and 16-QAM signal constellation for different MIMO orders. It can be inferred from the table that as the MIMO order increases, the complexity of the MMSE-SIC-SEARCH is much less than the complexity of the ML. However, the complexity of the MMSE-SIC-SEARCH is marginally higher than the complexity of MMSE-SIC.

Table 2 compares the complexity of the ZF-SIC-SEARCH with the complexity of the ZF-SIC and the ML.

TABLE 2

Complexity of ML, ZF-SIC and ZF-SIC-SEARCH

| | 4-QAM | | | 16-QAM | | |
|---|---|---|---|---|---|---|
| | ML | ZF-SIC | ZF-SIC-SEARCH | ML | ZF-SIC | ZF-SIC-SEARCH |
| $M_t = M_r = M$ | $\gamma^M M^2$ | $\frac{1}{2} M^3$ | $\frac{1}{2} M^3 + \frac{1}{2}\gamma M^2$ | $\gamma^M M^2$ | $\frac{1}{2} M^3$ | $\frac{1}{2} M^3 + \frac{1}{2}\gamma M^2$ |
| 2 | 64 | 20 | 44 | 1024 | 20 | 116 |
| 3 | 576 | 68 | 122 | 36864 | 68 | 284 |
| 4 | 4096 | 160 | 256 | 1048576 | 160 | 544 |

Table 2 gives the complexity of ML, ZF-SIC and ZF-SIC-SEARCH for 4-QAM and 16-QAM signal constellation for different MIMO orders. It can be observed from the table that the complexity of the ZF-SIC-SEARCH is much less than that of the ML as the MIMO order increases. However, the complexity of the ZF-SIC-SEARCH is marginally higher than that of ZF-SIC.

In accordance with various embodiments of the present invention, the closeness of the detection performance of the provided receiver to that of the ML receiver depends on the number of transmitting antennas and receiving antennas.

In accordance with various embodiments of the present invention, detection performance of the provided receiver is equivalent to the ML receiver when $M_r=2$.

In accordance with various embodiments of the present invention, the detection performance of the provided receiver is much better than the detection performance of linear receivers.

In accordance with various embodiments of the present invention, the complexity of the provided receiver is much less than the complexity of the ML receiver.

In accordance with various embodiments of the present invention, the complexity of the provided receiver is marginally higher than that of linear receivers.

In accordance with various embodiments of the present invention, the minimum post-detection SNR criterion enhances the probability that the transmitted data vector falls in the set of reduced possible solution vectors.

In accordance with various embodiments of the present invention, the method and system as described in the present invention can be embodied in a computer program, a Digital Signal Processor (DSP), or an Application Specific Integrated Circuit (ASIC) in a digital communication device.

The system, as described in the present invention or any of its components, may further be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. Computer comprises a microprocessor. Microprocessor is connected to a communication bus. Computer also includes a memory. Memory may include Random Access Memory (RAM) and Read Only Memory (ROM). Computer system further comprises storage device. It can be a hard disk drive or a removable storage drive such as a floppy disk drive, optical disk drive and the like. Storage device can also be other similar means for loading computer programs or other instructions into the computer system.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present invention. The set of instructions may be in the form of a software program. The software may be in various forms such as system software or application software. Further, the software might be in the form of a collection of separate programs, a program module with a larger program or a portion of a program module. The software might also include modular programming in the form of object-oriented programming. The processing of input data by the processing machine may be in response to user commands, or in response to results of previous processing or in response to a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for V-BLAST (Vertical Bell Labs Layered Space Time) detection, the V-BLAST system being a Multiple-Input Multiple-Output (MIMO) system that includes multiple transmitting and receiving antennas, the data being transmitted from the multiple transmitting antennas simultaneously as multiple data layers, each data layer being derived from same signal constellation, the data received at a receiver being in the form of a vector, the method comprising the steps of:
   a. calculating a matrix on the basis of channel matrix of the V-BLAST system;
   b. updating the channel matrix by deleting a column that corresponds to a maximum diagonal entry of the matrix, the maximum diagonal entry corresponding to a minimum post-detection Signal to Noise Ratio (SNR);
   c. calculating γ updated received vectors for a data layer, the data layer corresponding to the maximum diagonal entry, γ being the size of the signal constellation, the updated received vectors being calculated for all possible constellation points of the signal constellation of the data layer, the data layer corresponding to the maximum diagonal entry corresponds to the minimum post-detection SNR;
   d. performing Successive Interference Cancellation (SIC) iterations for each updated received vector for decoding the remaining data layers, the SIC being performed using the updated channel matrix until each data layer is decoded;

e. obtaining a set of reduced possible solution vectors from the SIC iterations; and f. detecting a solution vector nearest to the received vector from the set of the
reduced possible solution vectors, the nearest vector being detected by performing Maximum Likelihood (ML) search on the obtained set of the reduced possible solution vectors.

2. The method of claim 1, wherein a. the matrix is given by the mathematical term $(H^*H)^{-1}$, H being the channel matrix and superscript * denoting a complex conjugate transpose; and b. the SIC iterations are Zero Forcing with Successive Interference Cancellation (ZF-SIC) iterations, the ZF-SIC iterations being performed by using a ZF-SIC receiver.

3. The method of claim 1, wherein a. the matrix is given by the mathematical term $((H^*H+\sigma^2 M_t I)^{-1})$, H being the channel matrix, $\sigma^2$ being variance of noise corrupting received signal at each receiving antenna, and I being an identity matrix, superscript * denoting a complex conjugate transpose and $M_t$ being the number of transmitting antennas; and b. the SIC iterations are Minimum Mean-Squared-Error with Successive Interference Cancellation (MMSE-SIC) iterations, the MMSE-SIC iterations being performed by using a MMSE-SIC receiver.

4. The method of claim 1, wherein the step of updating the channel matrix by deleting the column corresponding to the data layer with the minimum post-detection SNR enhances the probability that a transmitted data vector falls in the set of the reduced possible solution vectors.

5. The method of claim 1, wherein the remaining data layer achieves diversity equal to $2M_r$, when a constellation point used in calculating an updated received vector for the data layer corresponding to the minimum post-detection SNR is same as that of the transmitted data vector for the data layer, $M_r$ being the number of receiving antennas, the number of the transmitting antennas being two.

6. The method of claim 1, wherein the method is carried out by at least one of a computer program, a digital signal processor and an Application Specific Integrated Circuit (ASIC) in a digital communication device.

7. A low complexity and near Maximum Likelihood (ML) performance receiver for a Vertical Bell Labs Layered Space-Time (V-BLAST) system, the receiver comprising:

a. an updating module, the updating module calculating updated received vectors by canceling out interference from a data layer, the data layer corresponding to a minimum post-detection Signal to Noise Ratio (SNR);

b. a linear receiver module, the linear receiver module decoding the remaining data layers for each updated received vector, to obtain a set of reduced possible solution vectors; and c. a reduced Maximum Likelihood (ML) search module, the ML module determining the vector nearest to the received vector from the set of reduced possible solution vectors.

8. The receiver of claim 7, wherein the linear receiver module is a Zero-Forcing Successive Interference Cancellation (ZF-SIC) module.

9. The receiver of claim 7, wherein the linear receiver module is a Minimum Mean-Squared-Error Successive Interference Cancellation (MMSE-SIC) module.

10. The receiver of claim 7, wherein the receiver is implemented using at least one of a computer program, a Digital Signal Processor (DSP), and an Application Specific Integrated Circuit (ASIC) in a digital communication device.

11. A system for V-BLAST (Vertical Bell Labs Layered Space Time) detection, the V-BLAST system being a Multiple-Input Multiple-Output (MIMO) system that includes multiple transmitting and receiving antennas, the data being transmitted from the multiple transmitting antennas simultaneously as multiple data layers, each data layer being derived from same signal constellation, the data received at a receiver being in the form of a vector, the system comprising:

a. means for calculating a matrix on the basis of channel matrix of the V-BLAST system;

b. means for updating the channel matrix by deleting a column that corresponds to a maximum diagonal entry of the matrix, the maximum diagonal entry corresponding to a minimum post-detection Signal to Noise Ratio (SNR);

c. means for calculating $\gamma$ updated received vectors for a data layer, the data layer corresponding to the maximum diagonal entry, $\gamma$ being the size of the signal constellation, the updated received vectors being calculated for all possible constellation points of the signal constellation of the data layer, the data layer corresponding to the maximum diagonal entry corresponds to the minimum post-detection SNR;

d. means for performing Successive Interference Cancellation (SIC) iterations for each updated received vector for decoding the remaining data layers, the SIC being performed using the updated channel matrix until each data layer is decoded;

e. means for obtaining a set of reduced possible solution vectors from the SIC iterations; and f. means for detecting a solution vector nearest to the received vector from the set of the reduced possible solution vectors, the nearest vector being detected by performing Maximum Likelihood (ML) search on the obtained set of the reduced possible solution vectors.

12. The system of claim 11, wherein the SIC iterations are performed by using a Zero-Forcing Successive Interference Cancellation (ZF-SIC) linear receiver.

13. The system of claim 11, wherein the SIC iterations are performed by using a Minimum Mean-Squared-Error Successive Interference Cancellation (MMSE-SIC) receiver.

* * * * *